(12) United States Patent
Yamazoe

(10) Patent No.: US 8,843,337 B2
(45) Date of Patent: Sep. 23, 2014

(54) APPARATUS FOR MEASURING SHAPE OF TEST SURFACE, AND RECORDING MEDIUM STORING PROGRAM FOR CALCULATING SHAPE OF TEST SURFACE

(75) Inventor: Kenji Yamazoe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 12/948,542

(22) Filed: Nov. 17, 2010

(65) Prior Publication Data

US 2011/0119011 A1 May 19, 2011

(30) Foreign Application Priority Data

Nov. 19, 2009 (WO) .................. PCT/JP2009/069663

(51) Int. Cl.
*G01D 18/00* (2006.01)
(52) U.S. Cl.
USPC .................................. 702/85; 702/86; 702/94
(58) Field of Classification Search
USPC ............. 702/85, 86, 94; 382/190; 356/2, 601; 73/37.5; 33/340–343
See application file for complete search history.

(56) References Cited

U.S. PATENT DOCUMENTS

| 6,025,955 | A  |   | 2/2000  | Hiraiwa et al. |         |
|-----------|----|---|---------|----------------|---------|
| 6,956,657 | B2 |   | 10/2005 | Golini et al.  |         |
| 7,136,519 | B2 |   | 11/2006 | Sinha et al.   |         |
| 7,433,057 | B2 | * | 10/2008 | Murphy et al.  | 356/601 |
| 7,774,152 | B2 | * | 8/2010  | Hamamoto       | 702/64  |

FOREIGN PATENT DOCUMENTS

| JP | 8-5505 A       | 1/1996  |
|----|----------------|---------|
| JP | 2000-321050 A  | 11/2000 |
| JP | 2003-519369 T  | 6/2003  |
| JP | 2004-125768 A1 | 6/2003  |
| JP | 2003-269952 A  | 9/2003  |
| JP | 2009-53066 A   | 3/2009  |
| WO | WO0150084 A1   | 7/2001  |

OTHER PUBLICATIONS

Weng W. Chow et al, "Method for subaperture testing interferogram reduction", Optics Letters.

Masashi Otsubo et al., "Measurement of large plane surface shapes by connecting small-aperture interferograms", Optical Engineering, Japan, SPIE press, Feb. 1994, vol. 33 No. 2, pp. 608-613.

* cited by examiner

*Primary Examiner* — Elias Desta
(74) *Attorney, Agent, or Firm* — Canon USA, Inc. IP Division

(57) ABSTRACT

An apparatus includes a measurement unit and a calculation unit, wherein the calculation unit expresses a measurement error of each measurement as a polynomial including a term that has a coefficient whose value is dependent on setting of the measurement area and a term that has a coefficient whose value is not dependent on the setting of the measurement area, obtains a matrix equation with respect to the coefficients of the polynomial by applying a least-squares method to each of the measurement data items for the overlapping region, assigns data about the terms of the polynomial and each of the measurement data items for the overlapping region to the matrix equation, calculates the coefficients of the polynomial from a singular value decomposition of the matrix equation to which the data has been assigned, and corrects each of the measurement data items for the measurement areas by using the coefficients.

8 Claims, 14 Drawing Sheets

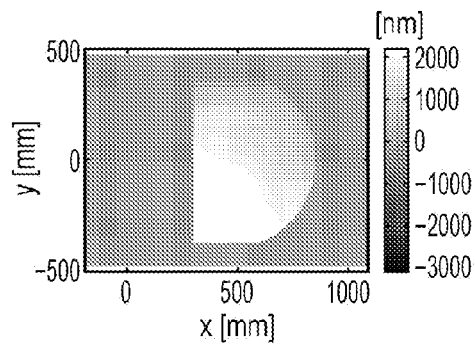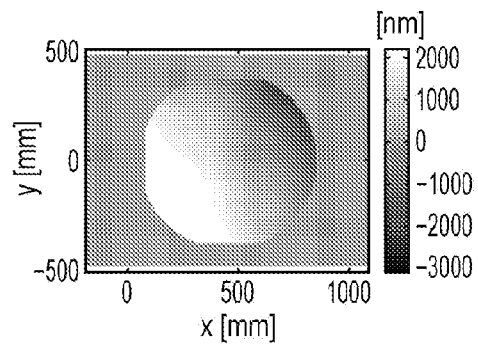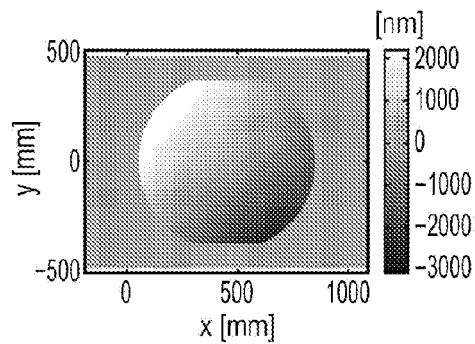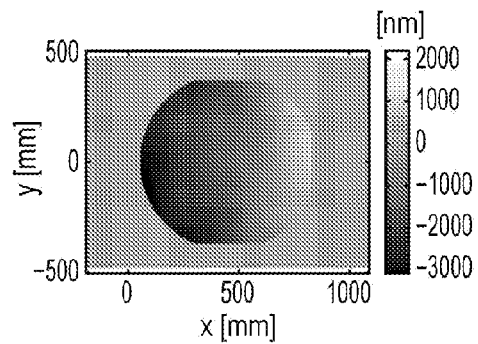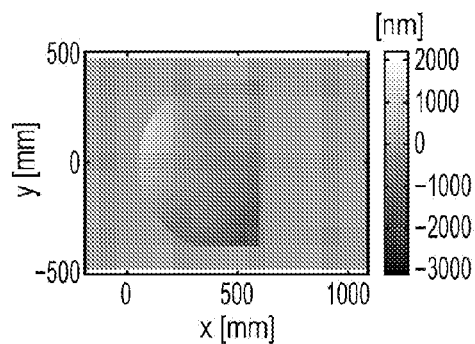

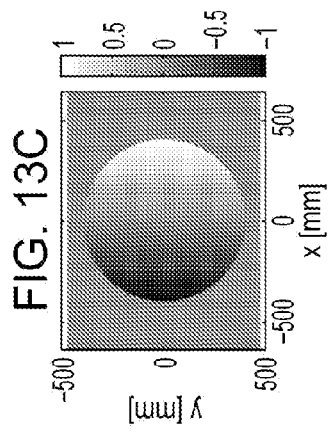
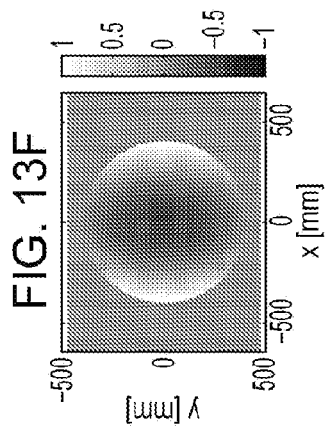
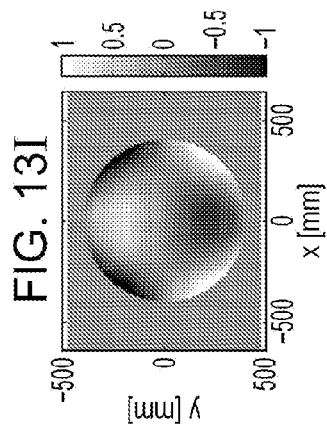
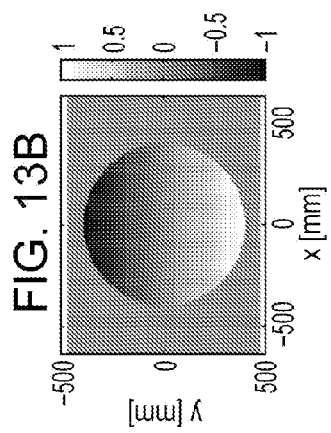
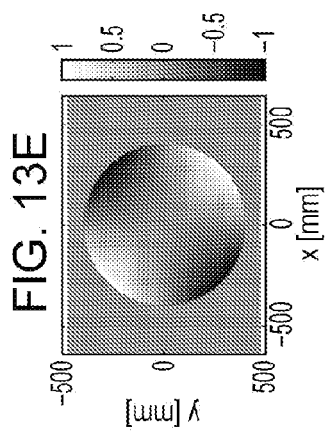
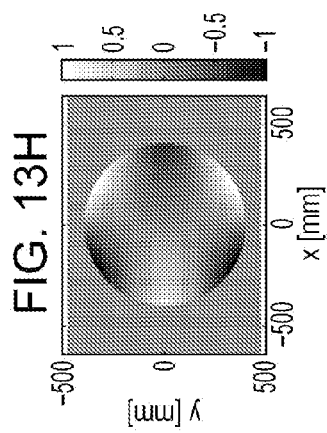
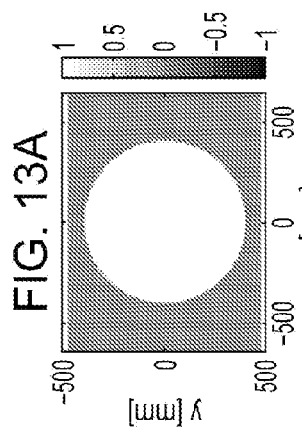
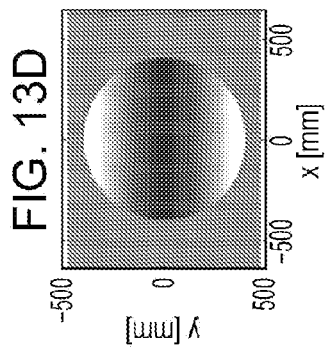
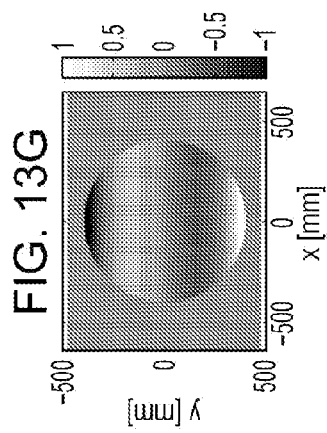

APPARATUS FOR MEASURING SHAPE OF TEST SURFACE, AND RECORDING MEDIUM STORING PROGRAM FOR CALCULATING SHAPE OF TEST SURFACE

CROSS REFERENCE TO RELATED APPLICATIONS

This application claims the benefit of International Application No. PCT/JP2009/069663, filed Nov. 19, 2009, which is hereby incorporated by reference herein in its entirety.

TECHNICAL FIELD

The present invention relates to an apparatus for measuring the shape of a test surface and a recording medium storing a program for calculating the shape of a test surface.

BACKGROUND ART

A stitching method is used to measure a test object having a large diameter. With the stitching method, shape measurement is repeated for partial regions of the test object by using a reference that is smaller than the test object, and data items obtained by measuring the shapes of the partial regions are stitched together by performing computation.

The stitching method may generate two types of measurement errors. First is an error that is generated when the position of a test object is moved due to mechanical instability while the partial regions are being measured. In the present description, this error will be referred to as a setting error. When there is a setting error, the shape data items obtained by measuring the partial regions include measurement errors that are different from each other. Second is an error inherent in the measurement system (optical system). In the present description, this error will be referred to as a system error. When there is a system error, the shape data items obtained by measuring the partial regions include measurement errors that are the same.

A sequential stitching method and a simultaneous stitching method are used to remove these errors. With the sequential stitching method, a reference shape data item is determined, the reference shape data item and shape data item adjacent to the reference shape data item are stitched together, and the stitched shape data item and the second adjacent shape data item are stitched together. All data items can be stitched together by repeating this process. However, a problem arises in that measurement errors accumulate. With the simultaneous stitching method, the shape data items are stitched together so as to minimize the accumulated error (see Weng W. Chow and George N. Lawrence, "Method for subaperture testing interferogram reduction", OPTICS LETTERS, U.S.A., September 1983, Vol. 8, No. 9, pp. 468-470 (hereinafter referred to as NPL 1); Masashi Otsubo, Katsuyuki Okada, Jumpei Tsujiuchi, "Measurement of large plane surface shapes by connecting small-aperture interferograms", OPTICAL ENGINEERING, Japan, SPIE press, February 1994, Vol. 33 No. 2, pp. 608-613 (hereinafter referred to as NPL 2); and U.S. Pat. No. 6,956,657 (hereinafter referred to as PTL 1)). In general, it is said that the shape of a test object can be measured more accurately by using the simultaneous stitching method.

NPL 1 discloses a method for simultaneously correcting the setting error and the system error by using an equation. NPL 2 discloses a stitching method that is used when the shape data items overlap each other. PTL 1 discloses a method for simultaneously correcting the setting error and the system error when the shape data items overlap each other.

The equation used in NPL 1 is obtained in the case in which the shape data items for the partial regions do not overlap each other, and the equation is unsolvable in the case in which the shape data items overlap each other. In NPL 2, an equation for correcting only the setting error without consideration of the system error is solved, so that the system error cannot be corrected. PTL 1 does not describe an equation for stitching, and an optimization loop is repeated so that the accumulated error is minimized. In general, it is very difficult to solve an optimization problem. Therefore, the technology of PTL 1 requires sophisticated and complicated data processing and requires a long calculation time.

SUMMARY OF INVENTION

According to an aspect of the present invention, there is provided an apparatus including a measurement unit that measures a shape of a test surface and a calculation unit that calculates the shape using measurement data, wherein the measurement unit sets a plurality of measurement areas in a part of the test surface and measures the shape such that each of the plurality of measurement areas forms an overlapping region with at least one of other measurement areas, and wherein the calculation unit reads a measurement data item for each of the measurement areas, expresses a measurement error of each measurement as a polynomial including a term that has a coefficient whose value is dependent on setting of the measurement area and a term that has a coefficient whose value is not dependent on the setting of the measurement area, obtains a matrix equation with respect to the coefficients of the polynomial by applying a least-squares method to each of the measurement data items for the overlapping region, assigns data about the terms of the polynomial and each of the measurement data items for the overlapping region to the matrix equation, calculates the coefficients of the polynomial from a singular value decomposition of the matrix equation to which the data has been assigned, and corrects each of the measurement data items for the measurement areas by using the coefficients that have been calculated, and calculates the shape of the test surface in the plurality of measurement areas by using the measurement data items that have been corrected.

Further features of the present invention will become apparent from the following description of exemplary embodiments with reference to the attached drawings.

BRIEF DESCRIPTION OF DRAWINGS

FIGS. 7A to 7E illustrate measurement data items for the measurement areas in Example 1.

FIGS. 13A to 13I illustrate the data of a polynomial in Example 3.

DESCRIPTION OF EMBODIMENTS

Figure 1:
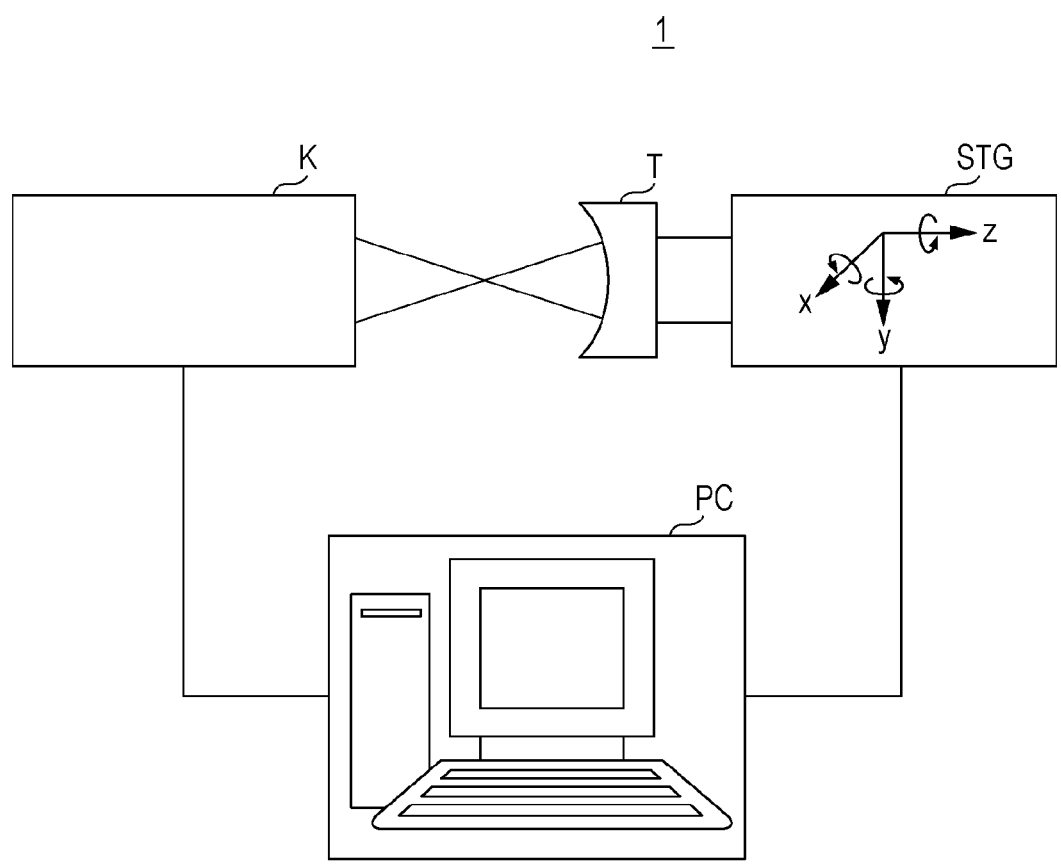
FIG. 1 illustrates the structure of an apparatus for measuring the shape of a test surface according to an embodiment.

FIG. 1 illustrates the structure of a measurement apparatus according to an embodiment of the present invention. A measurement apparatus 1 includes an interferometer K, which corresponds to a measurement unit, a stage STG, which holds and moves a test object T, and a computer PC (control unit), which controls the interferometer K and the stage STG. In the present embodiment, the shape of a test surface is measured using a general interferometer. An interferometer is an apparatus that measures the shape of a test surface or a transmitted wavefront using interference between a reference wave front and a test wavefront.

Figure 2:
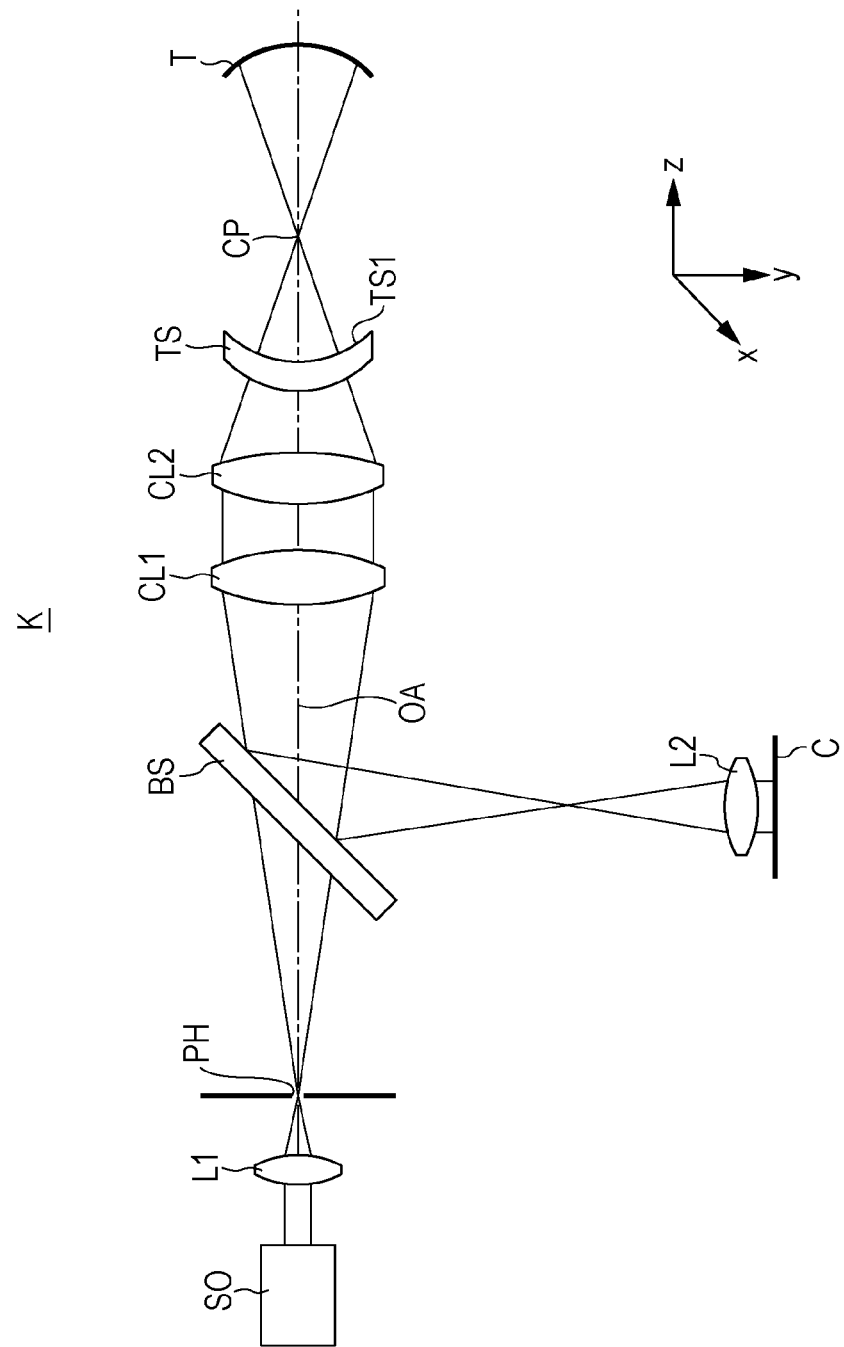
FIG. 2 is a schematic view of a Fizeau interferometer.

FIG. 2 illustrates a Fizeau interferometer, which is an example of the interferometer K. The interferometer K includes a quasi-monochromatic light source SO. The light source SO emits light, and a lens L1 focuses the light to a pinhole PH. After passing through the pinhole, the light diverges, passes through a beam splitter BS, and is collimated by a collimator lens CL1. The collimated light is converged by a converging lens CL2, and enters a lens TS for forming reference light. A surface TS1 of the lens TS facing the test object T reflects a part of the light and forms reference light (a reference wave front or a base wavefront). The part of the light reflected by the surface TS1 passes through the lenses CL2 and CL1, is reflected by the beam splitter BS, passes through a lens L2, and reaches an image pickup device C. The remaining part of light, which has passed through the lens TS, is focused on a convergence point CP.

If the measurement region of the test object T is concave, the test object T is disposed between the convergence point CP and the stage STG. If the measurement region of the test object T is convex, the test object T is disposed between the convergence point CP and the interferometer K. In FIG. 2, the measurement region of the test object T is concave. The light that has passed through the lens TS is incident on the test object T and reflected by the test object T. The light, which has been reflected by the test object T, is focused again on the convergence point CP, passes through the lenses TS, CL2, and CL1, is reflected by the beam splitter BS, passes through the lens L2, and reaches the image pickup device C. The reference light reflected by the lens TS and the light reflected by the test object T interfere with each other, so that an interference pattern is formed on an image pickup surface of the image pickup device C. A CCD, for example, is used as the image pickup device C.

It is preferable that the stage STG be a six-axis stage. In FIG. 2, the optical axis of the lens TS is denoted by OA, and the z axis is parallel to the optical axis of the lens TS. The x axis and the y axis, which are perpendicular to the z axis, are determined as coordinate axes of an orthogonal coordinate system. The x axis and the y axis are perpendicular to each other. The six-axis stage includes a stage that is movable along the x, y, and z axes, and rotation mechanisms around the x, y, and z axes. As described below, the accuracy of stitching data is increased if the rotation mechanism around the z axis is provided. If the test object T is a plane and is not a sphere or an aspheric surface, the six axis stage may include only a stage that is movable along the x, y, and z axis. The six-axis stage is expensive and may be substituted with a five-axis stage, which is less expensive.

The computer PC is connected to the stage STG and the interferometer K through communication cables. The computer PC sends a control signal to the stage STG in order to drive the stage STG. The stage STG receives the control signal, drives an actuator and thereby moves the test object T. The computer PC sends a control signal to the interferometer K so that the interferometer K obtains an interference pattern by using the image pickup device C in order to measure the shape of a test surface of the test object T. The data of the interference pattern captured by the interferometer K (image pickup device C) is sent to the computer PC, processed by a CPU, a DSP, or the like (a calculation unit) of the computer PC, and the shape of a test surface is calculated. The shape of the test surface can be calculated from the data of the interference pattern by using, for example, a phase shift method. With the phase shift method, a plurality of interference patterns are obtained while shifting the phase of the reference wave front, and the shape of the test surface is calculated from the data of the plurality of interference patterns.

The computer PC sends a control signal to the stage STG, and the stage STG moves the test object T to a first position. Subsequently, the computer PC sends a control signal to the interferometer K, and the interferometer K obtains an interference pattern. Data of the interference pattern is sent to the computer PC. The computer PC processes the data, thereby calculating the shape of a partial region of the test surface that has been set as a measurement area. The first position of the test object and the shape of the test surface are stored in a memory of the computer PC. By repeatedly performing the same process N times while changing the position of the test object, N sets of the position of the test object and the shape of the test surface are stored in the memory of the computer PC. The entire shape of the test surface can be calculated by stitching together the N sets of partial shapes of the test surface.

A method for stitching together the data items for the partial shapes of a test surface will be described below. For convenience of description, it is assumed that the entire shape of the test surface is planar.

Figure 3:
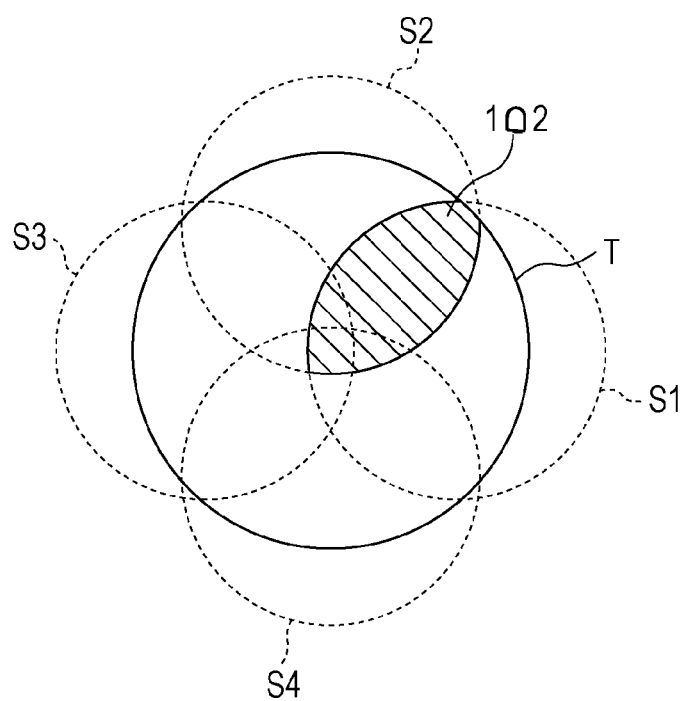
FIG. 3 illustrates measurement areas for measuring a part of the test surface.

In FIG. 3, a solid line represents the entire test surface of the test object T. Regions S1 to S4, which are represented by dotted lines, are measurement areas. The sizes of the measurement areas depend on the interferometer K. The regions S1 to S4 cover the entire area of the test surface of the test object T, but none of the regions S1 to S4 alone can cover the entire area of the test surface. In this example, four shape data items for the regions S1 to S4 are stitched together.

The measured shapes (measured data items) for the S1 to S4 will be denoted by $\Phi'_1$ to $\Phi'_4$. $\Phi'_1$ to $\Phi'_4$ include the setting error and the system error. First, a function for describing the setting error and the system error is defined. Here, a Zernike polynomial is used. In the present description, the i-th term of the Zernike polynomial is represented by $Z_i$ (where i is an integer equal to or larger than 1). In general, the first to fourth terms of the Zernike polynomial can be regarded as the setting error because these terms are dependent on the measurement conditions. Therefore, the setting error corresponds to terms that have coefficients whose values are dependent on the setting of the measurement areas. The fifth and higher order terms of the Zernike polynomial can be regarded as the system error because these terms have coefficients whose values are not dependent on the measurement conditions. Therefore, the system error corresponds to terms that have coefficients whose values are not dependent on the measurement conditions.

Hereinafter, $\Phi'_i$ will be explicitly represented by mathematical expressions. Let $\Phi_i$ denote the true shape of the test surface. Let $a^i_j$ denote the coefficient of the j-th term of the Zernike polynomial (where j is an integer equal to or larger than 1), which is included as the setting error in the shape data of a region Si (where i is an integer equal to or larger than 1). Let $b_k$ denote the coefficient of the k-th term of the Zernike polynomial (where k is an integer equal to or larger than 1), which is included as the system error in the shape data of the region Si. Let $(x_i, y_i)$ denote the position of an xy stage when the region Si is measured (or the position of the test object if the test object is used as the reference). $\Phi'_i$ is defined by expression 1.

$$\Phi'_i(x - x_i, y - y_i) \equiv \Phi_i(x - x_i, y - y_i) + \sum_{j=1}^{M} a^i_j Z_j(x - x_i, y - y_i) + \sum_{k=M+1}^{L} b_k Z_k(x - x_i, y - y_i) \quad \text{(expression 1)}$$

Because the setting error corresponds to the first to fourth terms of the Zernike polynomial, M=4. L represents the upper limit of the system error that is to be removed.

In order to minimize the accumulated error of $\Phi'_1$ and $\Phi'_2$, $a^1_j$, $a^2_j$, and $b_k$ should be determined so as to satisfy the condition represented by expression 2.

$$\sum_{1 \cap 2} [\Phi'_1(x - x_1, y - y_2) - \Phi'_2(x - x_2, y - y_2)]^2 \to \min \quad \text{(expression 2)}$$

Here, $1 \cap 2$ is the region in which the regions S1 and S2 overlap, which is shaded in FIG. 3. Expression 2 represents reduction of the accumulated error of the regions S1 and S2, but does not consider the accumulated error of the shape data for the region S3 or S4.

Therefore, expression 2 is extended to all regions, and $\Delta$ is defined by expression 3.

$$\Delta \equiv \sum_{s=1}^{N} \sum_{t=1}^{N} \sum_{s \cap 1} [\Phi'_s(x - x_s, y - y_s) - \Phi'_t(x - x_t, y - y_t)]^2 \quad \text{(expression 3)}$$

In this example, N=4 in expression 3. $a^i_j$ and $b_k$ should be determined so as to minimize $\Delta$ by using, for example, the least-squares method. That is, $\Delta$ is minimized when the derivatives of $\Delta$ with respect to $a^i_j$ and $b_k$ are zero. Thus, expression 4 can be obtained.

$$\frac{\partial \Delta}{\partial a^i_j} = 0 \quad \text{(expression 4)}$$

$$\frac{\partial \Delta}{\partial b_k} = 0$$

Because the setting error corresponds to the first to fourth terms of the Zernike polynomial (M=4), there are four $a^1_j$ (j=1, 2, 3, 4). Likewise, there are four sets of $a^2_j$, $a^3_j$, and $a^4_j$. If L, which is the upper limit of the terms of the Zernike polynomial that represents the system error, is 36, there are 32 $b_k$ (k=5, 6, ..., 36). Therefore, expression 4 yields 4×4+ 32=48 simultaneous equations. The simultaneous equations are represented in a matrix form by expression 5.

$$Y = ZA \quad \text{(expression 5)}$$

Y is a 48×1 vector, Z is a 48×48 matrix, and A is a 48×1 vector. Y and Z can be obtained from expression 4. A is an unknown.

Y can be explicitly written as expression (6).

$$Y = \begin{pmatrix} \Delta\Phi_1 \\ \Delta\Phi_2 \\ \vdots \\ \Delta\Phi_N \\ \Delta E \end{pmatrix} \quad \text{(expression 6)}$$

$$\Delta\Phi_i = \sum_{j=1}^{N} \sum_{i \cap j} \begin{pmatrix} [\Phi'_j(x - x_j, y - y_j) - \Phi'_i(x - x_i, y - y_i)] Z^i_1(x - x_i, y - y_i) \\ [\Phi'_j(x - x_j, y - y_j) - \Phi'_i(x - x_i, y - y_i)] Z^i_2(x - x_i, y - y_i) \\ [\Phi'_j(x - x_j, y - y_j) - \Phi'_i(x - x_i, y - y_i)] Z^i_3(x - x_i, y - y_i) \\ [\Phi'_j(x - x_j, y - y_j) - \Phi'_i(x - x_i, y - y_i)] Z^i_4(x - x_i, y - y_i) \end{pmatrix}$$

-continued $$\Delta E = \frac{1}{2}\sum_{i=1}^{N}\sum_{j=1}^{N}\sum_{i\cap j}\begin{pmatrix} [\Phi'_j(x-x_j, y-y_j) - \Phi'_i(x-x_i, y-y_i)][Z_5^j(x-x_j, y-y_j) - Z_5^i(x-x_i, y-y_i)] \\ [\Phi'_j(x-x_j, y-y_j) - \Phi'_i(x-x_i, y-y_i)][Z_6^j(x-x_j, y-y_j) - Z_6^i(x-x_i, y-y_i)] \\ \vdots \\ [\Phi'_j(x-x_j, y-y_j) - \Phi'_i(x-x_i, y-y_i)][Z_M^j(x-x_j, y-y_j) - Z_M^i(x-x_i, y-y_i)] \end{pmatrix}$$

Z can be explicitly written as expression 7.

$$Z = \begin{pmatrix} Z_{1,1} & -Z_{1,2} & \cdots & -Z_{1,N} & -S_1 \\ -Z_{2,1} & Z_{2,2} & & & -S_2 \\ \vdots & & \ddots & & \vdots \\ -Z_{N,1} & & & & -S_N \\ -S_1^T & -S_2^T & \cdots & -S_N^T & S \end{pmatrix} \quad \text{(expression 7)}$$

In expression 7, a superscript T represents a transposed matrix. $Z_{i,j}$ is an M×M matrix, which is a 4×4 matrix in this example. When i≠j, the (s,t) entry of $Z_{i,j}$ is represented by expression 8.

$$\sum_{i\cap j} Z_s^i(x-x_i, y-y_i) Z_t^j(x-x_j, y-y_j) \quad \text{(expression 8)}$$

When i=j, the (s,t) entry of $Z_{i,i}$ defines k≤N, and is represented by expression 9.

$$\sum_{k\neq i}\sum_{i\cap k} Z_s^i(x-x_i, y-y_i) Z_t^i(x-x_j, y-y_j) \quad \text{(expression 9)}$$

$S_i$ is an M×(L−M) matrix, and the (s,t) entry of $S_i$ is represented by expression 10.

$$\sum_{j\neq i}\sum_{i\cap j} Z_s^i(x-x_i, y-y_i) \quad \text{(expression 10)}$$

$$[Z_{M+t}^j(x-x_j, y-y_j) - Z_{M+t}^i(x-x_i, y-y_i)]$$

S is an (L−M)×(L−M) matrix, and the (s,t) entry of S is represented by expression 11.

$$-\frac{1}{2} \quad \text{(expression 11)}$$

$$\sum_{i=1}^{N}\sum_{j=1}^{N}\sum_{i\cap j} [Z_{M+s}^j(x-x_j, y-y_j) - Z_{M+s}^i(x-x_i, y-y_i)]$$

$$[Z_{M+t}^j(x-x_j, y-y_j) - Z_{M+t}^i(x-x_i, y-y_i)]$$

A can be explicitly written as expression 12.

$$A = \begin{pmatrix} A_1 \\ A_2 \\ A_3 \\ A_4 \\ B \end{pmatrix} \quad \text{(expression 12)}$$

$$A_i = \begin{pmatrix} a_1^i \\ a_2^i \\ a_3^i \\ a_4^i \end{pmatrix}$$

$$B = \begin{pmatrix} b_5 \\ \vdots \\ b_M \end{pmatrix}$$

The unknown A can be obtained by solving expression 5. In order to solve expression 5, it is necessary to multiply both sides of expression 5 by the inverse matrix of Z. However, the matrix Z does not have an inverse matrix. That is, the determinant of the matrix Z is zero or infinity. This occurs because the measurement error is expressed as the Zernike polynomial.

A method for solving expression 5 will be described below. A singular value decomposition of the matrix Z is represented by expression 13.

$$Z = USV^{\dagger} \quad \text{(expression 13)}$$

Here, † denotes a conjugate transposition (adjoint), U is a unitary matrix, and S is a diagonal matrix. If an inverse matrix is denoted by −1, $U^{-1}=U^{\dagger}$. V has a property that $V^{\dagger}V$ is a unit matrix. This characterizes the singular value decomposition. By using the singular value decomposition, the pseudo-inverse matrix Z' of the matrix Z can be represented by expression 14.

$$Z' = VS^{-1}U^{\dagger} \quad \text{(expression 14)}$$

Expression 5 can be solved by using expression 14 by calculating expression 15.

$$A = VS^{-1}U^{\dagger}Y \quad \text{(expression 15)}$$

A is obtained by using expression 15. Thus, the coefficients of the Zernike polynomial for correcting the setting error and the system error are obtained.

However, the pseudo inverse matrix does not necessarily solve the equation. For example, if the setting error is small, the setting error and the system error can be corrected using expression 15. However, if the setting error is large, the setting error and the system error may not be corrected using expression 15. In order to reduce the setting error, it is necessary to increase the accuracy of positioning the stage STG. In order to increase the accuracy of positioning the stage STG, it is necessary to increase the size of the stage, which is not preferable because the cost is increased.

Therefore, a method that is capable of correcting the setting error and the system error even when the setting error is large will be described below. The inventor has examined the cases in which the expression 15 is not properly solved when the setting error is large, and found that such cases occur because the fifth term and the sixth term of the Zernike polynomial are included in the system error. Therefore, the following expression 16 is used instead of expression 1.

$$\Phi'_i(x-x_i, y-y_i) \equiv \Phi_i(x-x_i, y-y_i) + \sum_{j=1}^{M} a^i_j Z_j(x-x_i, y-y_i) + \sum_{k=7}^{L} b'_k Z_k(x-x_i, y-y_i) \quad \text{(expression 16)}$$

Usually, M=4 in expression 16. Expression 16 differs from expression 1 in that, in expression 1, the (M+1)-th term and higher order terms of the Zernike polynomial are regarded as the system error, while, in expression 16, the seventh terms and higher order terms of the Zernike polynomial are regarded as the system error.

Expression 5 is obtained by using expression 16. Then, the setting error and the system error can be corrected by using expression 15. However, a component of the system error that depends on the fifth term and the sixth term of the Zernike polynomial is not corrected. For simplicity, the component of the system error that depends on the fifth term and the sixth term of the Zernike polynomial will be referred to as an astigmatism component of the system error. The astigmatism component of the system error can be represented as a quadratic function of x and y. To be specific, the fifth term of the Zernike polynomial is $x^2-y^2$, and the sixth term of the Zernike polynomial is $2xy$. Thus, the astigmatism component is a quadratic function of x and y. The seventh and higher order terms of the Zernike polynomial each can be represented as a polynomial function of x and y of an order of three or higher.

Figure 4A:
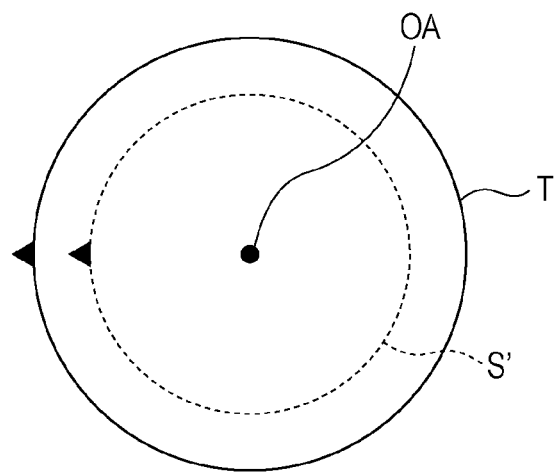
FIGS. 4A and 4B illustrate measurement for obtaining an astigmatism component of the system error.
Figure 4B:
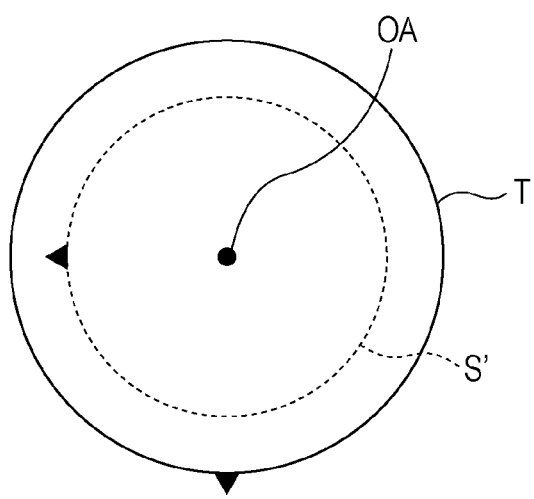

A different method is necessary to remove the astigmatism component of the system error. An example of the method will be described by using FIGS. 4A and 4B. In FIGS. 4A and 4B, triangular marks indicate the relationship between the orientation of the test object T and the orientation of the partial region (measurement area) S'. First, a shape W of a partial region S' of a test surface is measured in the state of FIG. 4A. Next, the test object T is rotated by an angle α around the optical axis as illustrated in FIG. 4B. In FIG. 4B, α is 90 degrees. A shape W' of the partial region S' of the test surface is measured in this state. Usually, W and W' do not match due to a positioning error that is generated when the stage STG is rotated and due to the system error of the interferometer K.

Let $\delta W = W' - W$, and $\delta W$ is fitted with a Zernike polynomial. Let $W_5$ denote the fifth term and $W_6$ denote the sixth term of the Zernike polynomial that is obtained as a result of the fitting. In this case, the fifth term $b_5$ and the sixth term $b_6$ of the system error can be calculated by expression 17.

$$b_5 = -\frac{W_5}{2} - \frac{\sin(2\alpha)}{2[\cos(2\alpha)-1]} W_6 \quad \text{(expression 17)}$$
$$b_6 = -\frac{W_6}{2} + \frac{\sin(2\alpha)}{2[\cos(2\alpha)-1]} W_5$$

It is necessary that α not be an integer multiple of 180 degrees. Expression 17 can be used irrespective of whether the test surface of the test object T is a plane or a sphere.

Let $a''^i_j$ and $b'_k$ denote the setting error and the system error that have been calculated. The shape data items of the test surface obtained by measurement can be corrected by using the following expression 18.

$$\Psi_i(x-x_i, y-y_i) \equiv \Phi'_i(x-x_i, y-y_i) - \sum_{j=1}^{M} a''^i_j Z_j(x-x_i, y-y_i) - \sum_{k=5}^{L} b'_k Z_k(x-x_i, y-y_i) \quad \text{(expression 18)}$$

The shape data items $\Psi_i$ that have been corrected are stitched together. Let $f_i$ be a function whose value is 1 in a region in which data exists in the shape data item for the region Si of the test surface and whose value is 0 in a region in which data does not exist in the shape data item for the region Si of the test surface. A function F that is the sum of $f_i$ is defined by expression 19.

$$F(x, y) = \sum_{i=1}^{N} f_i(x-x_i, y-y_i) \quad \text{(expression 19)}$$

For example, when F=2, two shape data items overlap, and when F=3, three shape data items overlap. By using F, the entire shape $\Psi$ of a test surface is represented by expression 20 by stitching the shapes of partial regions together.

$$\Psi(x, y) = \frac{\left[\sum_{i=1}^{N} \Psi_i(x-x_i, y-y_i)\right]}{F(x, y)}, [F(x, y) \neq 0] \quad \text{(expression 20)}$$

By using expression 20, the influence of errors, such as random noise and the reproducibility of the interferometer K, can be reduced owing to the averaging effect in a region in which the shape data items overlap. Moreover, a step in the stitched portion can be reduced owing to the averaging effect.

Figure 5:
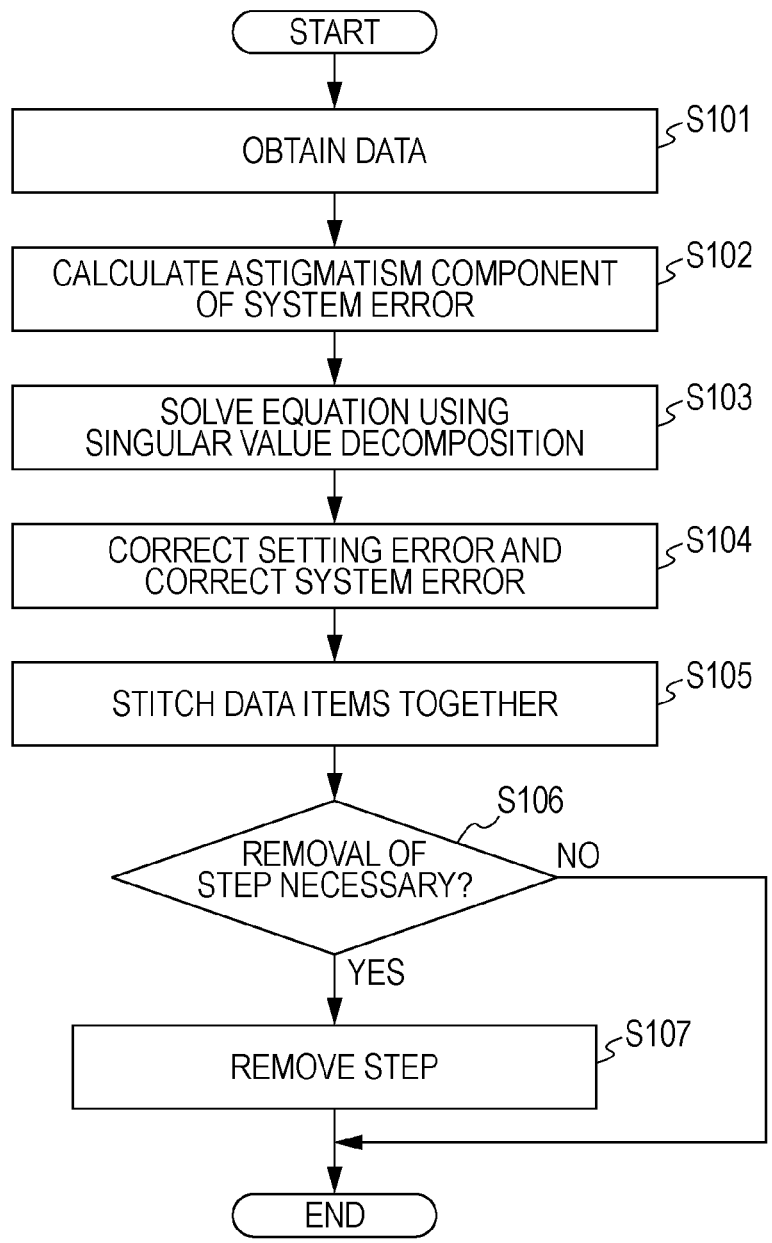
FIG. 5 is a flowchart for calculating a measurement error.

Referring to FIG. 5, the stitching method according to the embodiment will be described. In step S101, the shape data of a test surface and the like are obtained. The computer PC sends a control signal to the stage STG, and the stage STG moves the test object T to a first position. The image pickup device C of the interferometer K captures an image of a interference pattern in accordance with the control signal of the computer PC, and sends image data to the computer PC. The image of the interference pattern may be captured a plurality of times, and a plurality of image data items may be sent to the computer PC. The computer PC processes the image data to calculate a shape data item for a measurement area of the test surface.

Next, the measurement area of the test surface is changed by changing the position of the test object T, and a shape data item is calculated in a similar manner. The measurement area of the test surface is determined so that the measurement area overlaps at least one of other measurement areas. That is, a plurality of measurement areas are set in a part of the test surface and the shape of the test surface is measured in such a manner that each of the plurality of measurement areas forms an overlapping region with at least one of other measurement areas. The above operation is performed for N measurement areas of the test surface (positions of the test object T) to obtain N shape data items for the measurement areas of the test surface. The computer PC stores N sets of the shape data items and the positions of the stage STG (test object T) in the memory.

The computer PC also obtains data for calculating the astigmatism component of the system error. In order to calculate the astigmatism component of the system error, it is necessary to calculate a plurality of shape data items by rotating the test object T around the optical axis. Here, P (P>1) data items are obtained. The memory of the computer PC stores P sets of rotation angles around the optical axis and the shape data items.

In step S102, the astigmatism component of the system error is calculated using the data for calculating the astigmatism component of the system error, which has been obtained in step S101. In step S103, the coefficients for correcting the setting error and the system error to stitch the shape data items of the measurement areas together are calculated. First, the shape data items for the measurement areas obtained in step S102 are read from the memory, the data (Z) of the terms of the Zernike polynomial and the shape data items of the measurement areas obtained in step S102 are input to the matrix equation represented by expression 5, which has been calculated using expression 16. As shown in expressions (13) to (15), the singular value decomposition of the matrix Z is calculated, the pseudo inverse matrix is calculated, and the coefficient A for correcting the setting error and the system error is calculated using expression 15.

In step S104, the shape data items for the partial regions of the test surface are corrected. That is, the setting error and the system error of each of the shape data items are corrected on the basis of expression 18. In step S105, the shape data items, for which the setting error and the system error have been corrected in step S104, are stitched together by using expression 20. That is, the shapes of the measurement areas of the test surface are calculated using the corrected shape data items for the partial regions.

In step S106, whether or not to remove a step (discontinuous data), which has been generated due to stitching, is determined. It may be determined by examining the result of stitching, or it may be determined that the step is to be removed if the step is larger than a predetermined threshold. If it is determined in step S106 that the step is to be removed, the process proceeds to step S107. If it is determined that the step is to be removed, the process is finished. In step S107, the step is removed. That is, the region in which the step has been generated is detected, and the step is removed from the region. Data interpolation is performed on the region from which the step has been removed. Removal of the step will be described in detail in Example 1. After all the steps have been performed, the process is finished.

According to the embodiment, an existing optimization loop is not necessary, and the measurement error can be corrected and stitching can be performed by way of a comparatively simple computation. By setting the seventh and higher order terms of the Zernike polynomial (function of x and y having an order of three or higher) as the system error, even a large setting error can be removed. Moreover, the stitching error is reduced due to the averaging effect of expression 20. Furthermore, a method for removing the step that is generated during stitching, which will be described in detail in Examples below, is provided.

According to the embodiment, a reference partial shape is not necessary. In the invention described in NPL 2, it is necessary to select a reference partial shape in order to solve the equation represented by expression 5. For example, in the above example, according to the invention described in NPL 2, if the reference partial shape is a second partial shape, expression 12 can be represented as expression 21. The setting error of the reference partial shape is not corrected. The equation can be solved by using expressions (5) and (21).

$$A = \begin{pmatrix} A^1 \\ A^3 \\ A^4 \\ B \end{pmatrix} \quad \text{(expression 21)}$$

According to the present invention, without using a reference partial shape, the equation represented by expression 5 can be solved by using the singular value decomposition.

Hereinafter, Examples of the present invention will be described.

Example 1

Figure 6A:
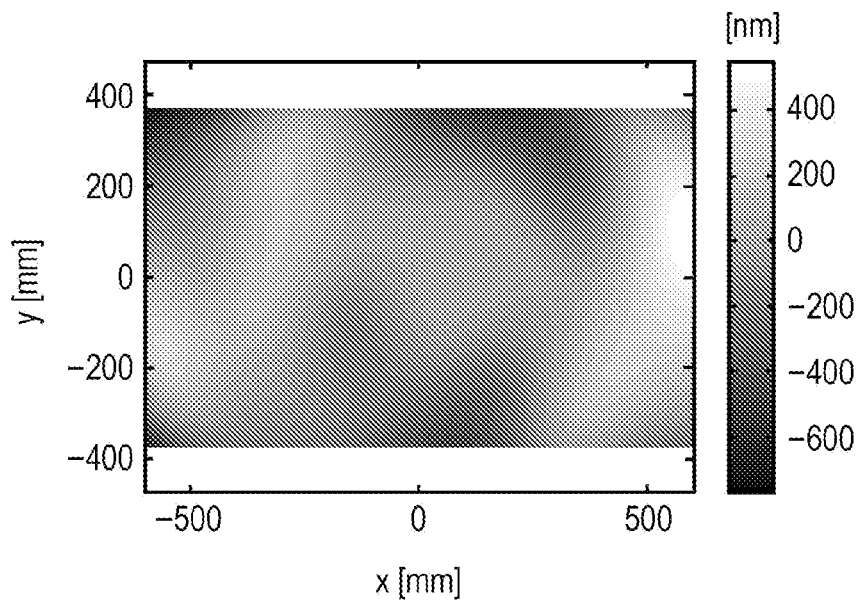
FIGS. 6A and 6B illustrate the shape and measurement areas of a flat mirror.
Figure 6B:
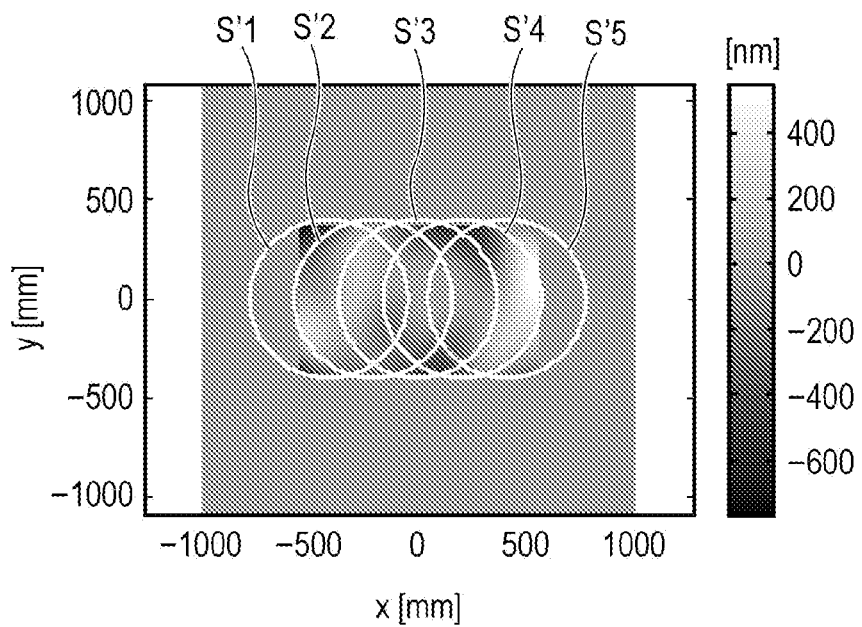

In the present example, stitching was performed on a test object that was a flat mirror. FIG. 6A illustrates the shape of a test surface of a flat mirror. The gradation shows concavities and convexities of the test surface. The flat mirror was a large mirror having a test surface with a long side larger than 1 m. The error between the actual shape of the test surface illustrated in FIG. 6A and an ideal plane was 206.5 nmRMS. FIG. 6B illustrates a state in which the test surface was divided into five partial regions S'1 to S'S and measured using a reference spherical wave forming lens TS having a diameter of 800 mm. White lines indicates the measurement regions. In the present example, N=5.

When the shape of the test surface was measured for the five partial regions S'1 to S'5, the measured shape was the sum of the actual shape of the test surface and errors, such as the positioning error of the stage STG (setting error) and the error of the interferometer (system error). FIGS. 7A to 7E illustrate the measurement results including the errors. FIGS. 7A, 7B, 7C, 7D, and 7E illustrate the measurement results for the partial regions S'1, S'2, S'3, S'4, and S'5, respectively.

Figure 8A:
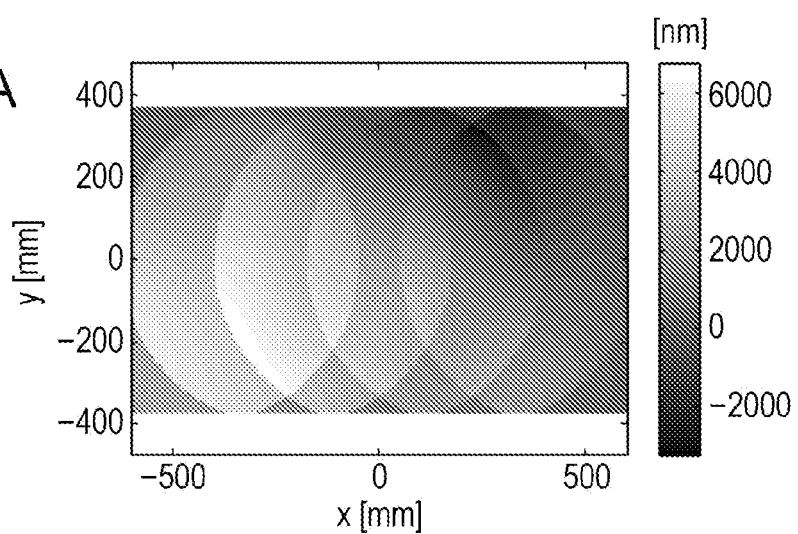
FIG. 8A illustrates the denominator of $\Psi(x,y)$ (N=5) of expression 20 in Example 1.
Figure 8B:
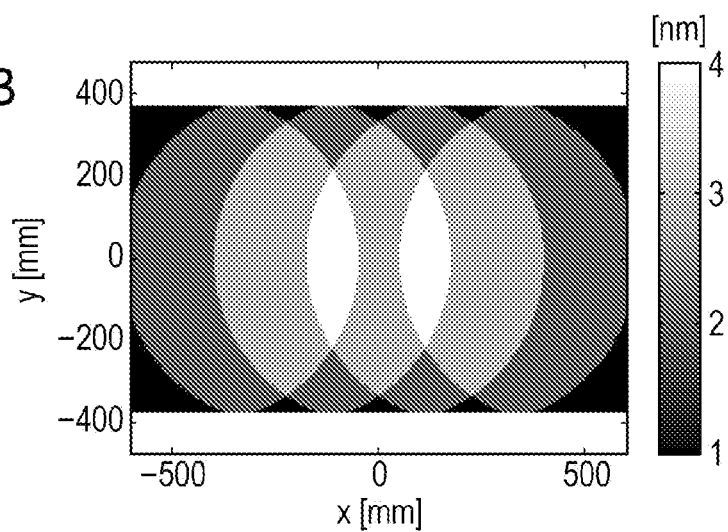
FIG. 8B illustrates $F(x,y)$ of expression 19 in Example 1.
Figure 8C:
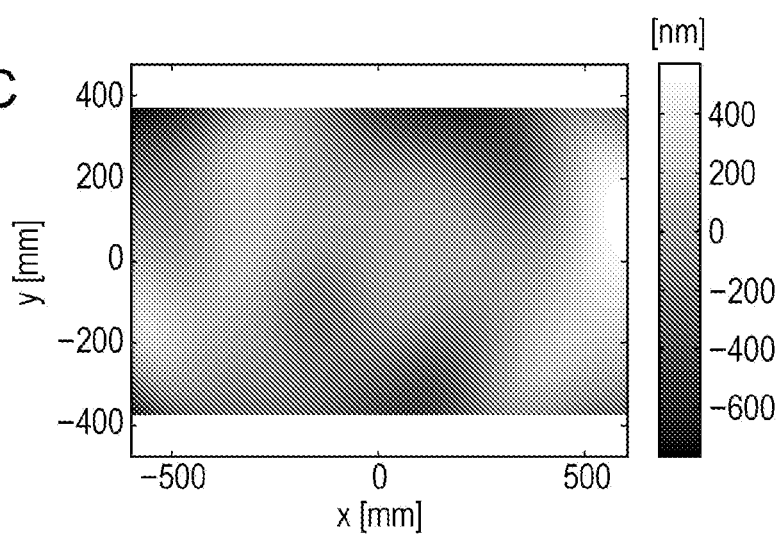
FIG. 8C illustrates the entire shape that has been calculated.

Using the measurement data of FIGS. 7A to 7E, the setting error and the system error were calculated on the basis of expression 5. Using the calculated setting error and the system error, $\Psi_i(x-x_i, y-y_i)$ was calculated on the basis of expression 18. FIG. 8A illustrates the denominator of $\Psi(x,y)$ of expression 20 (N=5), and FIG. 8B illustrates $F(x,y)$ of expression 19. FIG. 8C illustrates the entire shape $\Psi$ obtained by stitching the partial shapes together using these data items on the basis of expression 20. The error between the actual shape of the test surface, which is illustrated in FIG. 6A, and the calculated entire shape of the test surface, which is illustrated in FIG. 8C, was 9.2 nmRMS. This means that the stitching was performed sufficiently accurately.

Figure 9A:
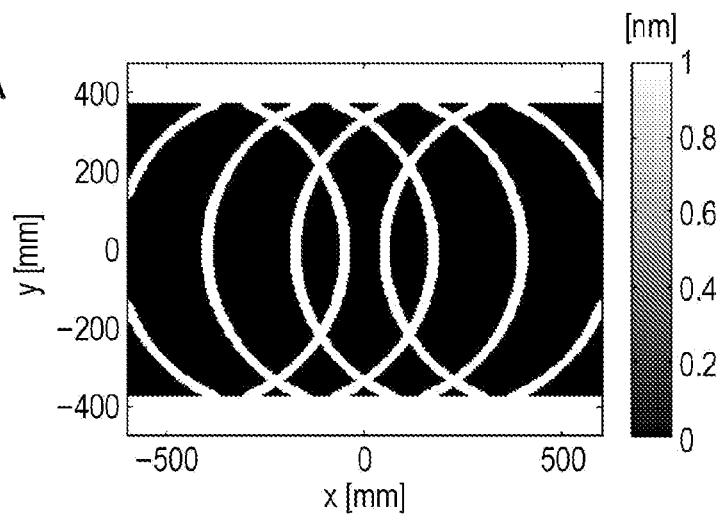
FIG. 9A illustrates a result of detecting regions in the vicinity of the stitched parts.

In some cases, removal of the setting error and the system error may fail and a step may be generated in the stitched part between partial shapes. A method for removing the step will be described below. By applying a second-order differential operator (Laplacian) to $F(x,y)$, the stitched part (step) of partial shapes can be detected. FIG. 9A illustrates the result of detecting the region in the vicinity of the stitched part. In FIG. 9A, the region in which the value is 1 (white area) is the region in which the step is generated. From the data for the entire shape (FIG. 8C) that has been calculated, the region in which the value is 1 in FIG. 9A is deleted. By interpolating the data for the deleted region, the step can be removed.

Next, a method for interpolating the data will be described. The data of FIG. 8C, from which the region in which the value is 1 in FIG. 9A has been removed, is Fourier transformed to extract a component having a low spatial frequency, and is subsequently inverse Fourier transformed. The inverse Fourier transformed data is allocated to the region having the value 1 in FIG. 9A. The data is Fourier transformed again to extract a component having a low spatial frequency, and is subsequently inverse Fourier transformed. The inverse Fourier transformed data is allocated to the region having the value 1 in FIG. 9A. By repeating the process described above, the data can be interpolated.

Figure 9B:
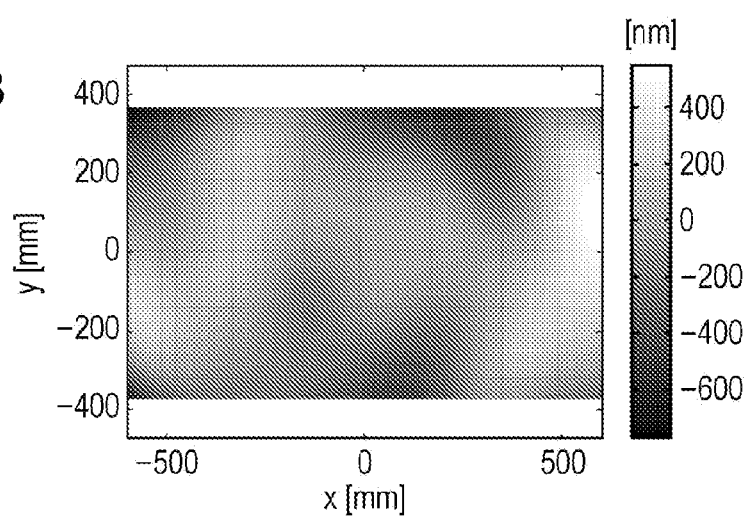
FIG. 9B illustrates the result of removing a step.
Figure 9C:
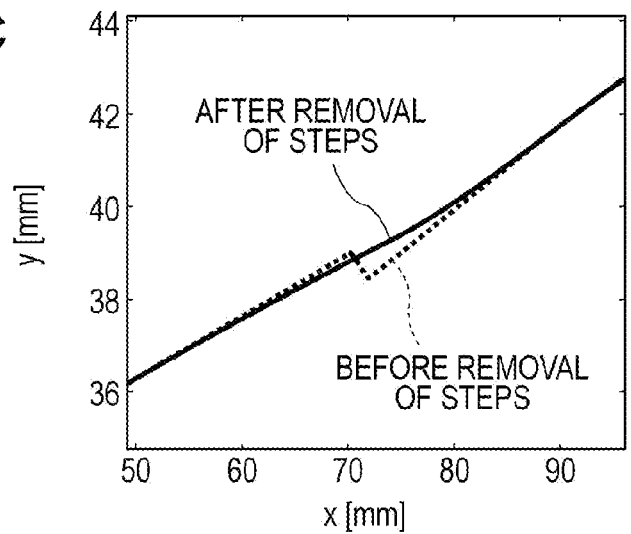
FIG. 9C illustrates a comparison of data between before and after the step is removed.

FIG. 9B illustrates the result after the data has been interpolated and the step has been removed from the data of FIG. 8C. FIG. 9C is the sectional figure of FIG. 8C and FIG. 9B taken along a line y=130 mm. In FIG. 9C, a dotted line represents a sectional figure before the step has been removed (FIG. 8C), and a solid line represents a sectional figure after the step has been removed (FIG. 9B). In can be seen that the step having the depth of several nm, which had been present before being removed, was removed by using the method described above.

A method for machining the test surface by using the data of the entire shape of the test surface will be described. First, the entire shape of the test surface is measured. If there is a step in the data of the entire shape, the step is removed. Removal of the step from the measurement data is preferable, because the step may produce a negative effect on machining of the test surface. The difference between the data obtained after removal of the step and an ideally machined shape (design value) is calculated to obtain machining data. Using the machining data, the test surface is machined until the difference is eliminated. By using the machining method described above, the test surface can be accurately machined. Moreover, optical components that have been difficult to produce can be produced.

Example 2

Figure 10A:
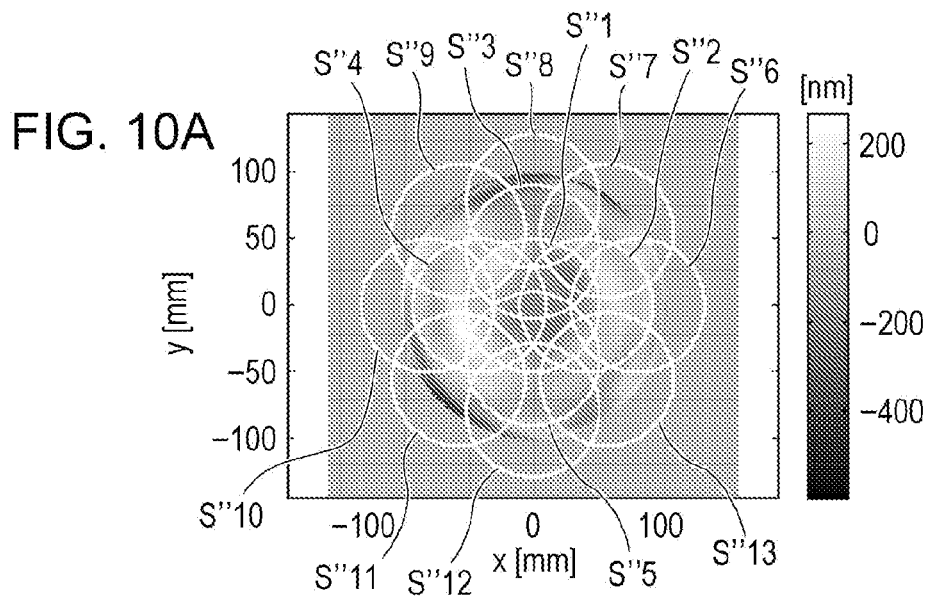
FIG. 10A illustrates the shape and measurement areas of a test surface.

In the present example, stitching was performed on an optical element having a spherical shape, such as a lens. Measuring and stitching partial shapes of a sphere by using an interferometer is more complicated than measuring and stitching a planar shape. FIG. 10A illustrates the shape of a test surface and a state in which the test surface was divided into thirteen partial regions S"1 to S"13 and measured.

Figure 10B:
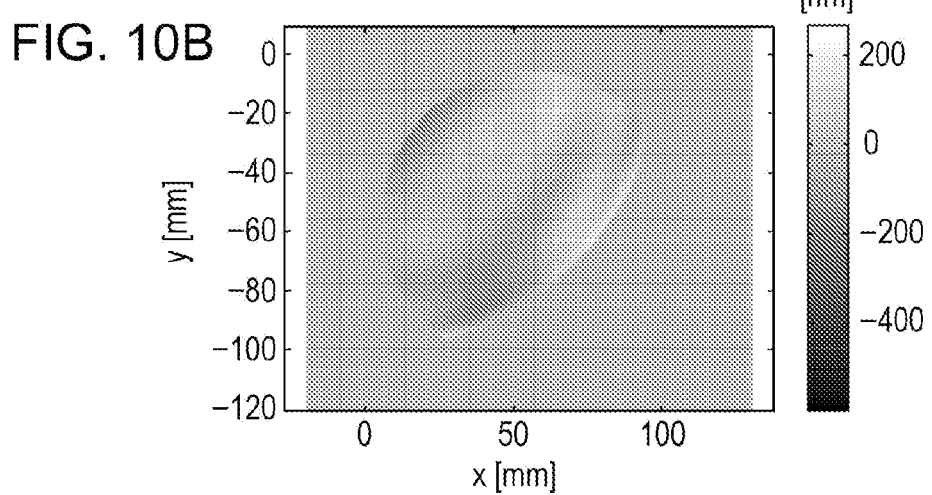
FIG. 10B illustrates a result of a measuring S"13 by using a six-axis stage.
Figure 10C:
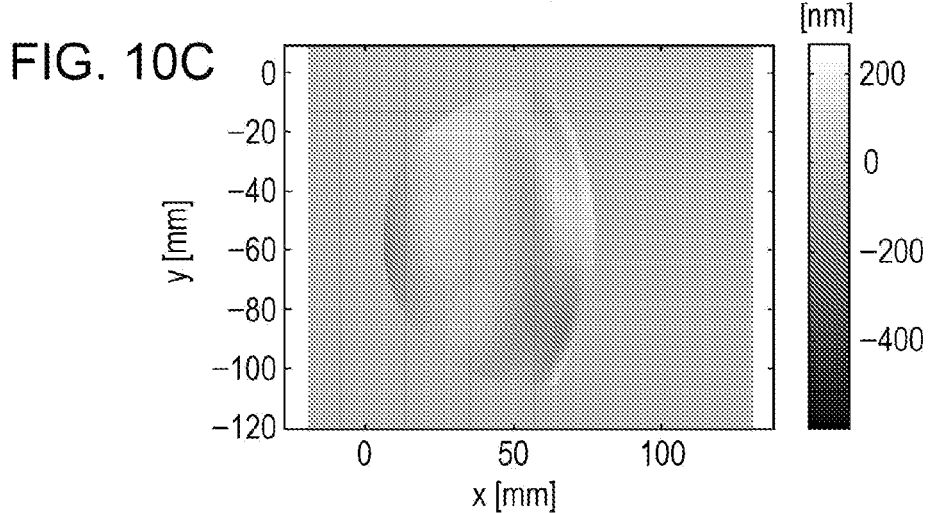
FIG. 10C illustrates a result of measuring S"13 by using a five-axis stage.

FIG. 10B illustrates the data of the partial shape of the partial region S"13 that was obtained when the stage STG was a six-axis stage and there was no positioning error. However, because the six-axis stage is expensive, a five-axis stage, which is comparatively low-cost, was used in the present example. A five-axis stage refers to a stage that has an xyz stage, a rotation mechanism around the x axis, and a rotation mechanism around the y axis. When measuring the partial region S"13 by using the five-axis stage, the test object was rotated around the x axis, and subsequently the test object was rotated around the z axis. FIG. 10C illustrates the data of the partial shape of the partial region S"13 that was to be obtained when there was no error in positioning the stage STG.

Ideally, the measurement result illustrated in FIG. 10B was to be obtained. However, the measurement result illustrated in FIG. 10C was obtained due to the use of the five-axis stage. Therefore, it was necessary to rotate the measurement data of FIG. 10C to covert the data to that of FIG. 10B. This process is characteristic of the five-axis stage.

Figure 11:
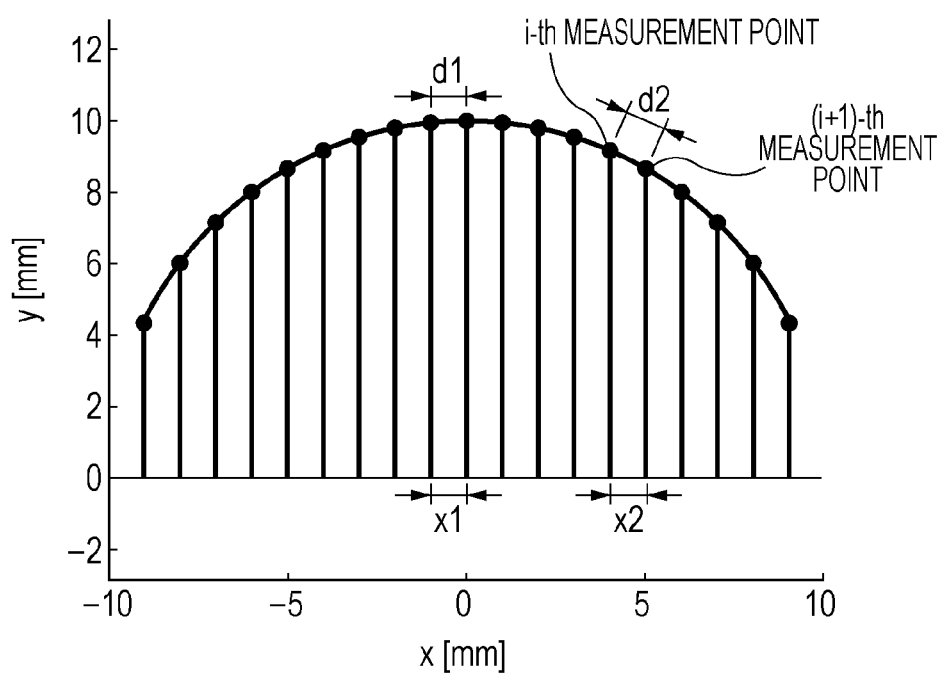
FIG. 11 illustrates unequal distances of coordinates.

There is a characteristic process when a spherical shape is measured with an interferometer. The interferometer obtains data so that the x coordinate and the y coordinate have the same distance. This will be described by using FIG. 11. The test object is a sphere having a radius of 10 mm and a diameter of 18 mm. FIG. 11 illustrates measurement points when the cross section of the test object where y=0 is measured using an interferometer. For the measurement point where x=0 and the measurement point adjacent thereto, the distance between the x coordinates is represented by x1, and the distance on the sphere is represented by d1. For the i-th measurement point and the (i+1)-th measurement point, the distance between the x coordinates is represented by x2, and the distance on the sphere is represented by d2. As can be seen from FIG. 11, the interferometer is designed so that x1 is equal to x2. However, d1 is not equal to d2 because the test object is a sphere.

The test object is rotated around the y axis so that the i-th measurement point corresponds to x=0. If the shape is measured in the state in which the test object has been rotated, the distance between the x coordinates of the i-th measurement point and the (i+1)-th measurement point remains to be x1, but the distance on the sphere becomes d1. As a result, the measurement points on the sphere are changed between before and after the rotation. Therefore, it is necessary to make the measurement points the same between before and after the rotation. Usually, this is accomplished by interpolating the shape data. In the present description, making the measurement points the same between before and after the rotation is referred to as coordinate transformation.

It is necessary to perform coordinate transformation of the measurement data in order to stitch a spherical shape. Moreover, it is necessary to rotate the data when the five-axis stage is used. Because it is necessary to perform coordinate transformation and rotation on the measurement data, it is also necessary to perform coordinate transformation and rotation on the system errors included in the partial shapes. That is, it is necessary to perform coordinate transformation and rotation on the Zernike polynomial of expression 1, (16), or (18).

Figure 12A:
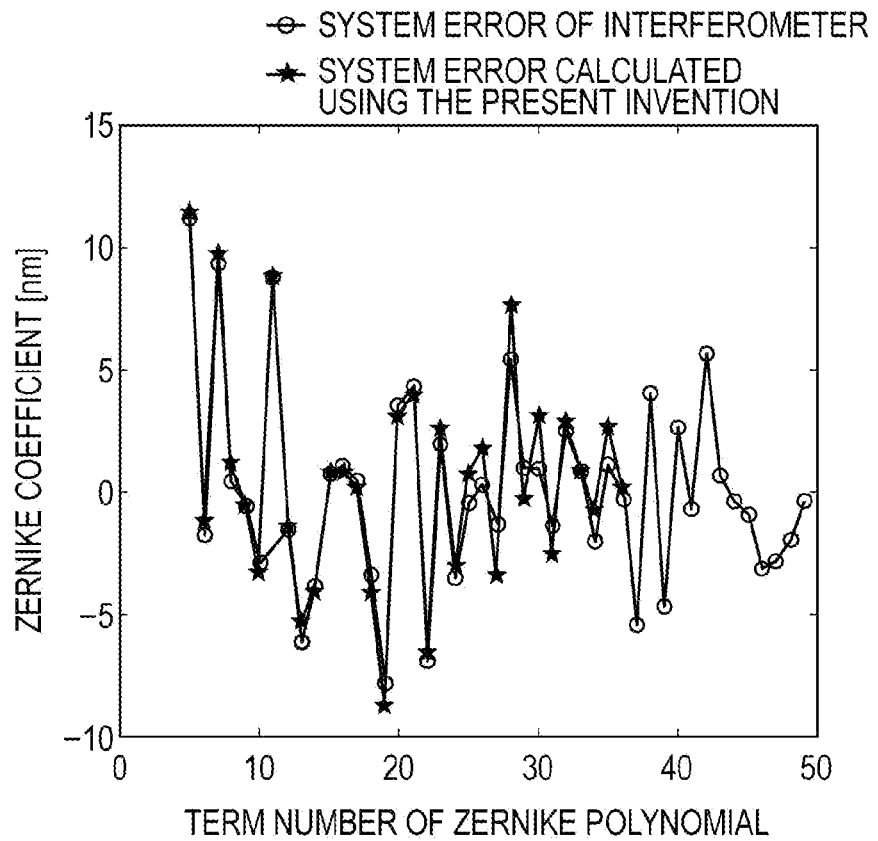
FIG. 12A illustrates the values of the terms of the system error.
Figure 12B:
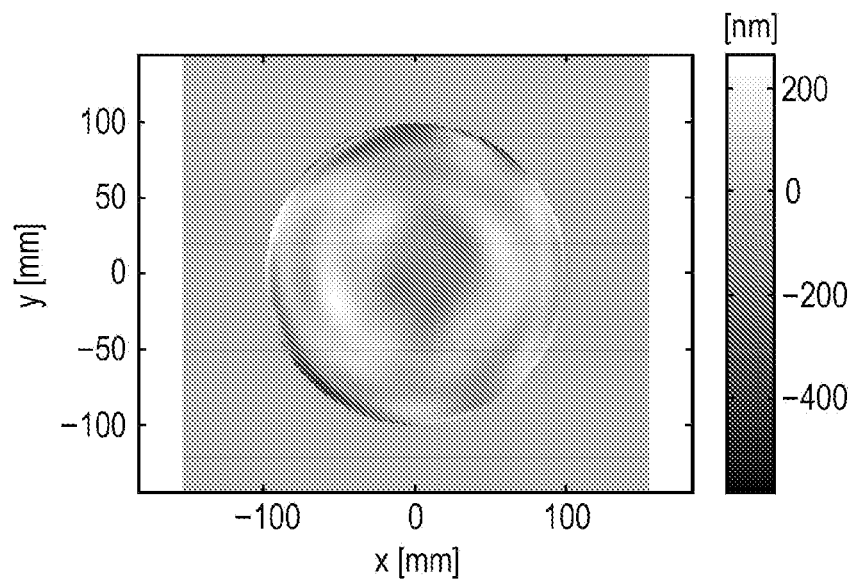
FIG. 12B illustrates the shape of a test surface after the measurement error has been corrected in Example 2.

After the above processing had been performed, the partial regions of the test object illustrated in FIG. 10A were measured, and the entire shape was calculated by using the stitching method described in the embodiment. It is assumed that the stage STG had a positioning error of several μm, and the interferometer K had a system error of about 8.5 nmRMS. In the present example, among the system error of the interferometer K, the fifth term to the thirty sixth term of the Zernike polynomial were calculated as correction coefficients. That is, L=36 in expression 16. FIG. 12A illustrates the coefficients of the Zernike polynomial for the actual system error of the interferometer and the coefficients of the Zernike polynomial for the system error that was calculated according to the present example. It can be seen that the system error of the interferometer was calculated with sufficient accuracy. FIG. 12B illustrates the result obtained after the system error was corrected and the stitching was performed. The difference between the test surface and the result of stitching was about 5.2 nmRMS. This means that a sufficient accuracy was achieved, considering the fact that the test surface had an error with respect to an ideal spherical shape by about 100 nmRMS. In order to increase the accuracy, the system error may be corrected to a higher order. For example, by making L=169 in expression 16, the stitching can be performed more accurately. Moreover, the step may be removed as in Example 1.

Example 3

In Examples described above, the measurement error is represented by the Zernike polynomial. In the present example, the stitching was performed by using a different polynomial. The measurement apparatus, the test object, and the measurement data were the same as those of Example 1.

As a polynomial for representing the measurement error, a function obtained by normalizing an xy polynomial by using the Gram-Schmidt process and being orthogonal in an effective circular region of the reference sphere forming lens TS was used. FIGS. 13A to 13I illustrate the first to the ninth terms of the orthogonal functions. In the xy polynomial, the first term is 1, the second term is x, the third term is y, the fourth term is $x^2$, the fifth term is xy, the sixth term is $y^2$, the seventh term is $x^3$, the eighth term is $x^2y$, the ninth term is $xy^2$, the tenth term is $y^3$, and the following terms are defined in the same manner.

Figure 14:
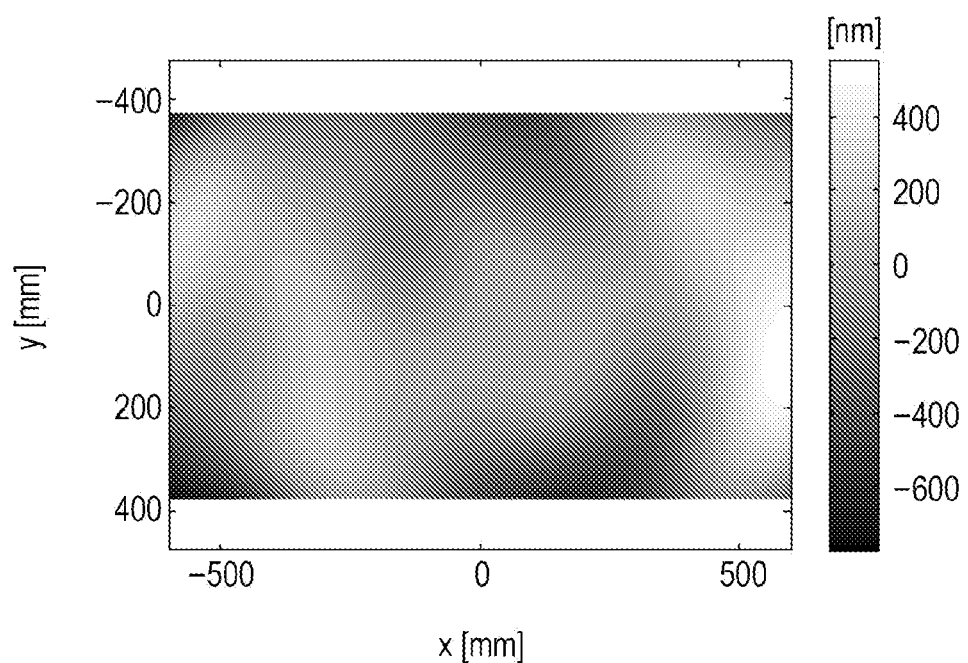
FIG. 14 illustrates the shape of a test surface after the measurement error has been corrected in Example 3.

FIG. 14 illustrates the result of stitching performed by using this polynomial. The difference between the actual shape of the test surface illustrated in FIG. 6A and the shape illustrated in FIG. 19 was 8.8 nmRMS. This means that the stitching was performed with sufficient accuracy.

According to the embodiment, not only a planar or spherical surface, but also an aspheric surface can be stitched. In order to measure the shape of an aspheric surface, it is necessary to set a large number of partial regions. The measurement system may not be an interferometer. A so-called "contact-type" measurement system can be used.

The present invention can be realized by providing software (program) implementing the function of the above embodiment to a system or an apparatus through a network or various storage media and by making a computer (CPU or the like) of the system or the apparatus read and execute the program.

According to the present invention, a measurement error can be corrected and stitching can be performed with a comparatively simple processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

| | |
|---|---|
| K | interferometer |
| STG | stage |
| PC | computer |

What is claimed is:

1. An apparatus comprising:
a measurement unit that measures a test surface; and
a calculation unit that calculates a shape of the test surface using measurement data,
wherein the measurement unit sets a plurality of measurement areas in the test surface, each of the plurality of measurement areas being a part of the wafer and measures the test surface such that each of the plurality of measurement areas forms an overlapping region with at least one of other measurement areas, and
wherein the calculation unit
reads a measurement data item for each of the measurement areas,
expresses a measurement error of each measurement as a polynomial including a term that has a coefficient whose value is dependent on setting of the measurement area and a term that has a coefficient whose value is not dependent on the setting of the measurement area,
obtains a matrix equation with respect to the coefficients of the polynomial by applying a least-squares method to each of the measurement data items for the overlapping region,
assigns data about the terms of the polynomial and each of the measurement data items for the overlapping region to the matrix equation,
calculates the coefficients of the polynomial from a singular value decomposition of the matrix equation to which the data has been assigned, and
corrects each of the measurement data items for the measurement areas using the calculated coefficients, and calculates the shape of the test surface in the plurality of measurement areas using the corrected measurement data items.

2. The apparatus according to claim 1, wherein the calculation unit detects a region in which a step of data is generated when the corrected measurement data items are stitched together, deletes data for the region in which the step has been detected, and interpolates data.

3. The apparatus according to claim 1, wherein, in the matrix equation, among the term having a coefficient whose value is not dependent on the setting of the measurement area, quadratic terms with respect to x and y are removed, where x and y are coordinate axes of an orthogonal coordinate system.

4. A method for calculating a shape of a test surface, the method comprising:
setting a plurality of measurement areas in the test surface, each of the plurality of measurement areas being a part of the wafer and measuring the test surface such that each of the plurality of measurement areas forms an overlapping region with at least one of other measurement areas;
reading a measurement data item for each of the measurement areas;
expressing a measurement error of each measurement as a polynomial including a term that has a coefficient whose value is dependent on setting of the measurement area and a term that has a coefficient whose value is not dependent on the setting of the measurement area,
obtaining a matrix equation with respect to the coefficients of the polynomial by applying a least-squares method to each of the measurement data items for the overlapping region;
assigning data about the terms of the polynomial and each of the measurement data items for the overlapping region to the matrix equation
calculating the coefficients of the polynomial from a singular value decomposition of the matrix equation to which the data has been assigned
correcting each of the measurement data items for the measurement areas using the calculated coefficients; and
calculating, using a processor, the shape of the test surface in the plurality of measurement areas using the corrected measurement data items.

5. A machining method for machining a test surface by using data about a shape of the test surface, the data being calculated by the method according to claim 4.

6. A non-transitory recordable medium storing a program that causes a computer to perform the method according to claim 4.

7. The method according to claim 4, wherein, the calculating the shape of the test surface includes detecting a region in which data is generated when the corrected measurement data items are stitched together, deleting data for the region, and interpolating data.

8. The method according to claim 4, further comprising, in the matrix equation, among the terms having coefficients whose values are not dependent on the setting of the measurement areas, removing quadratic terms with respect to x and y, where x and y are coordinate axes of an orthogonal coordinate system.

* * * * *